United States Patent
Minoyama

(10) Patent No.: US 11,654,832 B2
(45) Date of Patent: May 23, 2023

(54) VEHICLE STORAGE STRUCTURE

(71) Applicant: HONDA MOTOR CO., LTD., Tokyo (JP)

(72) Inventor: Wataru Minoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 17/201,579

(22) Filed: Mar. 15, 2021

(65) Prior Publication Data

US 2021/0284072 A1    Sep. 16, 2021

(30) Foreign Application Priority Data

Mar. 16, 2020    (JP) .............................. JP2020-045831

(51) Int. Cl.
*B60R 7/04*    (2006.01)
*H02J 50/00*    (2016.01)

(52) U.S. Cl.
CPC .............. *B60R 7/04* (2013.01); *H02J 50/005* (2020.01)

(58) Field of Classification Search
CPC .. B60R 7/04; B60R 7/06; H02J 50/005; H02J 7/0044; H02J 50/00
USPC ............................ 296/24.34, 70, 37.8, 37.12
See application file for complete search history.

(56) References Cited

U.S. PATENT DOCUMENTS

| | | |
|---|---|---|
| 2004/0195767 A1 | 10/2004 | Randall |
| 2007/0194526 A1 | 8/2007 | Randall |
| 2008/0246215 A1 | 10/2008 | Randall |
| 2009/0072782 A1 | 3/2009 | Randall |
| 2009/0098750 A1 | 4/2009 | Randall |
| 2011/0148041 A1 | 6/2011 | Randall |
| 2012/0080958 A1 | 4/2012 | Randall |
| 2014/0167438 A1* | 6/2014 | Lambert ............... H02J 7/0044 320/108 |
| 2014/0203770 A1* | 7/2014 | Salter ...................... H02J 50/10 320/108 |
| 2014/0347009 A1 | 11/2014 | Hongo |

(Continued)

FOREIGN PATENT DOCUMENTS

| | | |
|---|---|---|
| JP | S61-199442 U | 12/1986 |
| JP | 2000-043648 A | 2/2000 |

(Continued)

OTHER PUBLICATIONS

Office Action received in corresponding Japanese application No. 2020-045831 dated Oct. 5, 2021 with English translation (6 pages).

(Continued)

*Primary Examiner* — Jason S Morrow
*Assistant Examiner* — E Turner Hicks
(74) *Attorney, Agent, or Firm* — Rankin, Hill & Clark LLP

(57) ABSTRACT

A vehicle storage structure includes a center console, an instrument panel, and a storage having an opening. The center console includes a front part. The storage is located at least one of the front part, a portion in front of the center console, or the instrument panel. The storage includes a first storage and a second storage. The first storage is located lower or higher than the second storage. The first storage includes a side wall and a first opening. The side wall is located proximate to a passenger seat in a vehicle width direction. The first opening is located proximate to a driver's seat in the vehicle width direction.

8 Claims, 5 Drawing Sheets

(56) References Cited

U.S. PATENT DOCUMENTS

| | | | |
|---|---|---|---|
| 2015/0069776 A1 | 3/2015 | Ishibashi et al. | |
| 2018/0224909 A1* | 8/2018 | Koo | H02J 50/10 |
| 2019/0315290 A1* | 10/2019 | Shinohara | F16B 21/086 |
| 2021/0206328 A1* | 7/2021 | Grimbach | B60N 3/002 |
| 2021/0273476 A1* | 9/2021 | Wippler | H02J 7/00032 |
| 2022/0281386 A1* | 9/2022 | Rhee | B60R 16/03 |

FOREIGN PATENT DOCUMENTS

| | | |
|---|---|---|
| JP | 2000-142175 A | 5/2000 |
| JP | 2002-104083 A | 4/2002 |
| JP | 2005-081895 A | 3/2005 |
| JP | 2007-015523 A | 1/2007 |
| JP | 2009-061959 A | 3/2009 |
| JP | 2010-520741 A | 6/2010 |
| JP | 2010-143309 A | 7/2010 |
| JP | 2011-230694 A | 11/2011 |
| JP | 2012-214087 A | 11/2012 |
| JP | 2013-121245 A | 6/2013 |
| JP | 2014-133503 A | 7/2014 |
| JP | 2014-133509 A | 7/2014 |
| JP | 2015-051698 A | 3/2015 |
| JP | 2016-088433 A | 5/2016 |
| JP | 2018-001854 A | 1/2018 |
| JP | 2019-182324 A | 10/2019 |

OTHER PUBLICATIONS

Office Action received in corresponding Japanese application No. 2020-045831 dated Jan. 11, 2022 with English translation (6 pages).

* cited by examiner

VEHICLE STORAGE STRUCTURE

CROSS REFERENCE TO RELATED APPLICATIONS

This application claims the foreign priority benefit under 35 U.S.C. § 119 of Japanese patent application No. 2020-045831 filed on Mar. 16, 2020, the disclosure of which is incorporated herein by reference.

BACKGROUND OF THE INVENTION

1. Field of the Invention

The present invention relates to a vehicle storage structure.

2. Description of the Related Art

There are cases in which a storage having an opening on each side in the vehicle width direction is provided under the center console in the passenger compartment of a vehicle.

In these cases, since articles of the occupant in the driver's seat and the occupant in the passenger seat are stored mixedly in one storage, there is a possibility of taking a wrong article.

To address this issue, Japanese Patent Application Publication No. 2014-133509 (hereinafter called patent document 1) discloses a technique in which part of the opening is separated with a wall in the vehicle width direction.

SUMMARY OF THE INVENTION

In the technique disclosed in patent document 1, a shared storage for the occupants on both sides and storages separated by the wall and each dedicated for the corresponding occupant on one side are lined continuously in the front-rear direction. Hence, the dedicated storages are small, and in addition, there is a possibility of confusing the dedicated storages and the shared storage. Thus, there remains a possibility of taking a wrong article in the shared storage.

The present invention has been made in light of the above point, and an object thereof is to provide a vehicle storage structure that makes it possible to prevent taking a wrong article.

A vehicle storage structure includes a center console, an instrument panel, and a storage having an opening. The center console includes a front part. The storage is located at least one of the front part, a portion in front of the center console, or the instrument panel. The storage includes a first storage and a second storage. The first storage is located lower or higher than the second storage. The first storage includes a side wall and a first opening. The side wall is located proximate to a passenger seat in a vehicle width direction. The first opening is located proximate to a driver's seat in the vehicle width direction.

The present invention makes it possible to prevent the occupant in the passenger seat from taking a wrong article by means of the side wall.

DETAILED DESCRIPTION OF THE EMBODIMENTS

An embodiment of the present invention will be described in detail with reference to the drawings. In the following description, the same constituents are denoted by the same symbols, and repetitive description thereof is omitted. The expressions meaning directions such as front-rear, upper-lower, and right-left are based on the traveling direction of the vehicle.

Figure 1:
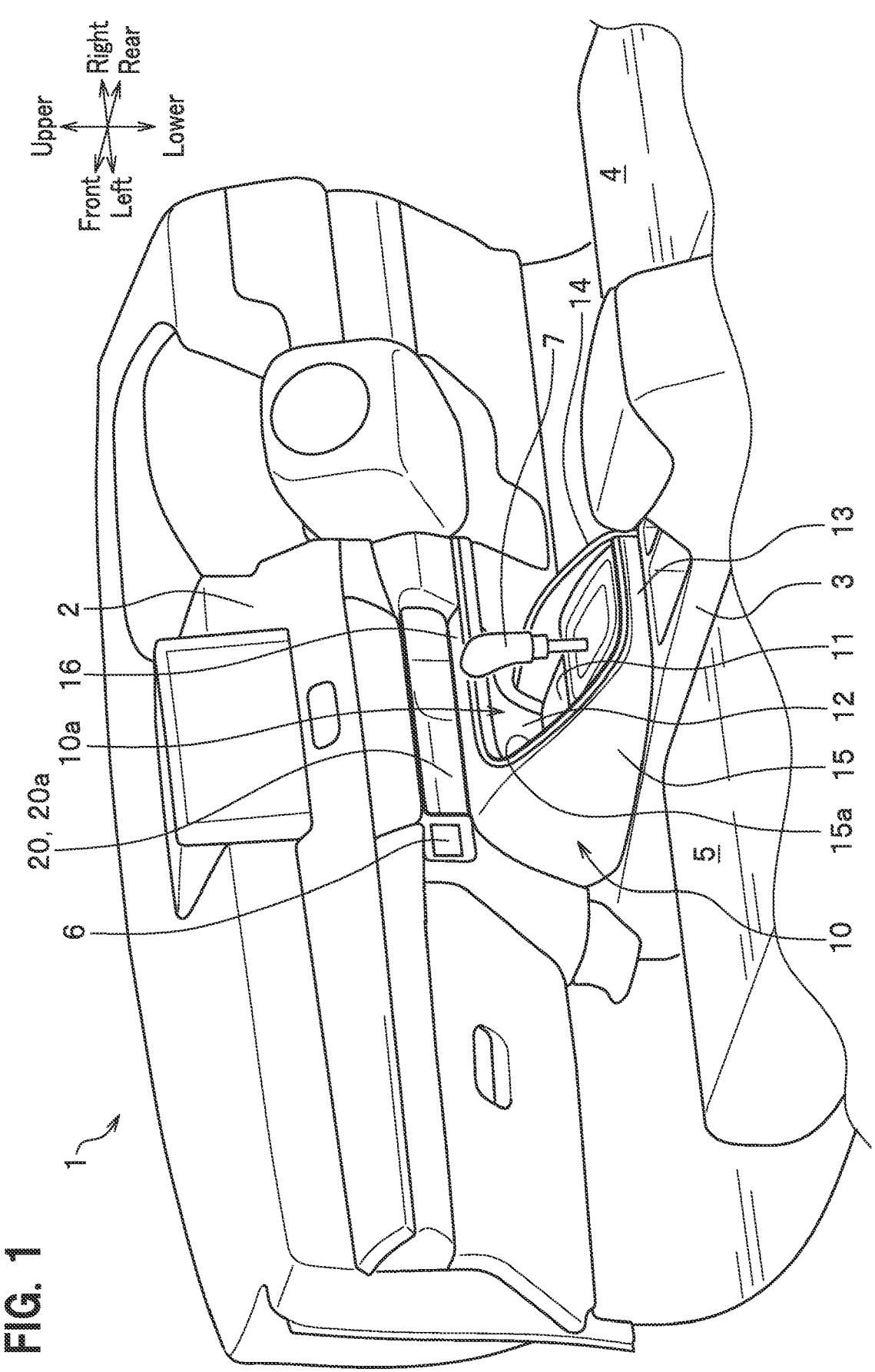
FIG. 1 is a schematic view of a vehicle storage structure according to an embodiment of the present invention from the passenger compartment side.
Figure 2:
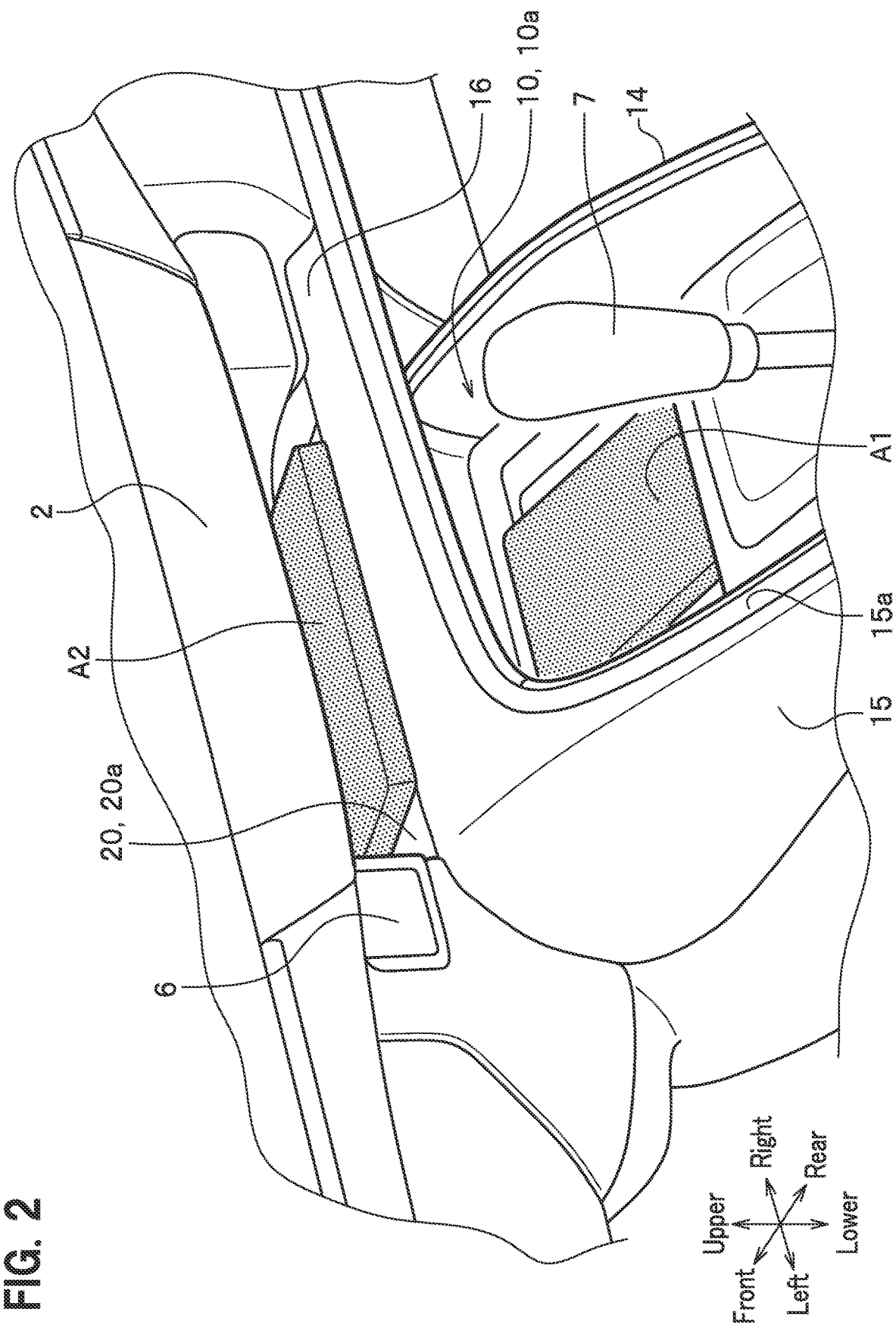
FIG. 2 is a partially enlarged view of FIG. 1.

As illustrated in FIGS. 1 and 2, a vehicle storage structure 1 includes an instrument panel 2, a center console 3, and a connection member 10 and has a first storage and a second storage 20 at at least one of a front portion of the center console 3, a portion in front of the center console 3, and a portion in the instrument panel 2.

<Instrument Panel>

The instrument panel 2 is a kind of vehicle interior member provided in front of the driver's seat 4 and the passenger seat 5 and is a resin member serving as a design surface on the front side of the passenger compartment. The instrument panel 2 is formed by combining a plurality of members. The instrument panel 2 has the second storage 20 which is described later. The instrument panel 2 also has a connection terminal (for example, a Universal Serial Bus (USB) socket) 6 on the passenger seat 5 side of the second storage 20 in the vehicle width direction.

<Center Console>

The center console 3 is provided between the driver's seat 4 and the passenger seat 5 and is a resin member extending in the front-rear direction on the vehicle floor. On the center console 3 is provided an actuator 7. The actuator 7 is operated by the occupant in the driver's seat 4 and thereby actuates a device mounted on the vehicle. The actuator 7, for example, is a shift lever that protrudes upward from the center console 3 and actuates a transmission device.

<Connection Member (First Storage)>

The connection member 10 is a resin member connecting the rear side of a lower end portion of the instrument panel 2 and the upper side of a front end portion of the center console 3. The connection member 10 is formed by combining a plurality of members. A front portion of the connection member 10 serves as the first storage used by the occupant of the driver's seat 4. The connection member 10 integrally includes a bottom wall 11, a front wall 12 extending upward from the front end of the bottom wall 11, and a rear rib 13 extending upward from the rear end of the bottom wall 11. The connection member 10 also integrally includes a side rib 14 extending upward from the driver's-seat-4-side end of the bottom wall 11 and a side wall 15 extending upward from the passenger-seat-5-side end of the bottom wall 11. The connection member 10 also integrally includes an extension wall (extension portion) 16 extending rearward from the upper end of the front wall 12. In the connection member 10, the opening 10a of the first storage is formed by the driver's-seat-4-side end in the vehicle width direction (the upper portion of the side rib 14) and the upper end and the rear end (between the upper end of the front wall 12 and the rear rib 13). The side wall 15 is provided at an upper portion on the passenger-seat-5-side end in the vehicle width direction of the center console 3.

Figure 5:
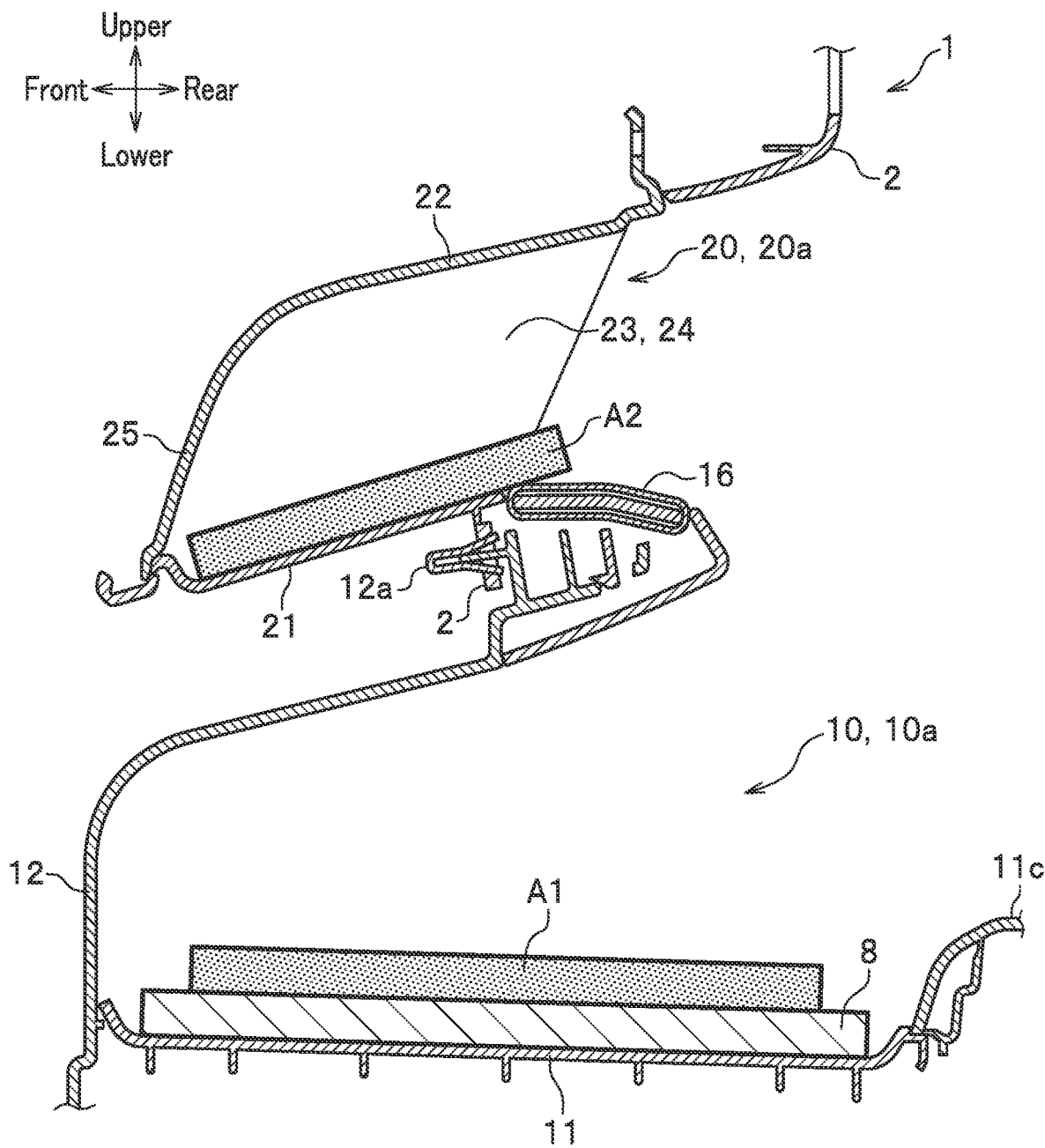
FIG. 5 is a schematic cross-sectional view of the vehicle storage structure according to the embodiment of the present invention.

The upper surface of a front portion of the bottom wall 11 serves as an article-placing portion of the first storage on which an article A1 is placed. The dimension in the vehicle width direction of the bottom wall 11 serving as the article-placing portion is approximately the same as the dimension in the vehicle width direction of the center console 3. As illustrated in FIG. 5, on the bottom wall 11 is provided a non-contact charger 8. The non-contact charger 8 wirelessly transfers electric power to the article A1, which is an electronic device.

At a rear portion of the bottom wall 11 (a below-mentioned frame portion in the present embodiment) is formed a hole 11a (see FIG. 3) through which the actuator 7 (see FIG. 2) is inserted. The bottom wall 11 (a below-mentioned connection-member main body in the present embodiment) has a plurality of engagement pieces 11b (see FIG. 3). The engagement pieces 11b are inserted into engagement portions 3a formed on the upper end of the center console 3 from the rear side and engaged so that the movements in the front direction and the up-down direction are restricted.

As illustrated in FIG. 5, at the front edge of the hole 11a of the bottom wall 11 is formed a protrusion 11c extending in the vehicle width direction. The protrusion 11c and the side rib 14 prevent the article A1 from falling off the first storage.

Figure 4:
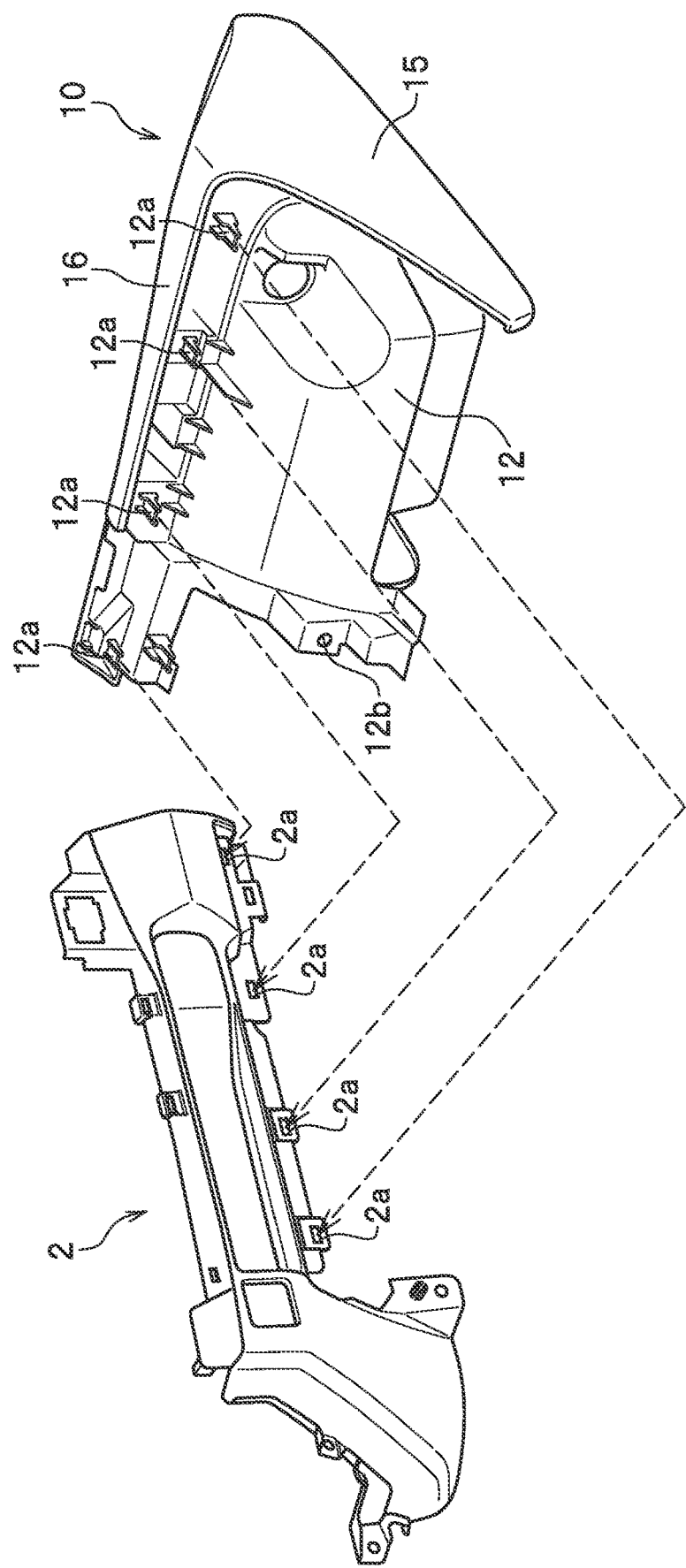
FIG. 4 is a schematic diagram for explaining how the instrument panel and the connection member are combined.

The front wall 12 is inclined such that the higher a position is, the further rearward it is positioned. As illustrated in FIG. 4, at upper end portions of the front wall 12 are formed a plurality of engagement pieces (clips) 12a protruding toward the front. The engagement pieces 12a are inserted into holes 2a formed in the instrument panel 2 from the rear side. The front wall 12 also has a hole 12b through which a pin, a screw, a protrusion formed on the instrument panel 2, or the like is inserted to fix the front wall 12 to the instrument panel 2.

As illustrated in FIGS. 1 and 2, the upper end of the side wall 15 is formed to connect the upper end of the front wall 12 and the upper end of the rear rib 13. Specifically, the side wall 15 has a triangular shape in side view, and the upper end of a rear portion of the side wall 15 (from an intermediate portion in the front-rear direction to the rear end) has an inclined portion 15a the height of which decreases toward the rear. The rear end of the inclined portion 15a is located rearwardly from the rear end (the protrusion 11c) of the first storage. The inclined portion 15a described above may be formed on the entire part in the front-rear direction of the side wall 15, or it may be formed on a part in the front-rear direction of the side wall 15. In the latter case, the side wall 15 has, on the front side of the inclined portion 15a, a high wall portion having the same height as the front end of the inclined portion 15a, or the side wall 15 has, on the rear side of the inclined portion 15a, a low wall portion having the same height as the rear end of the inclined portion 15a.

Figure 3:
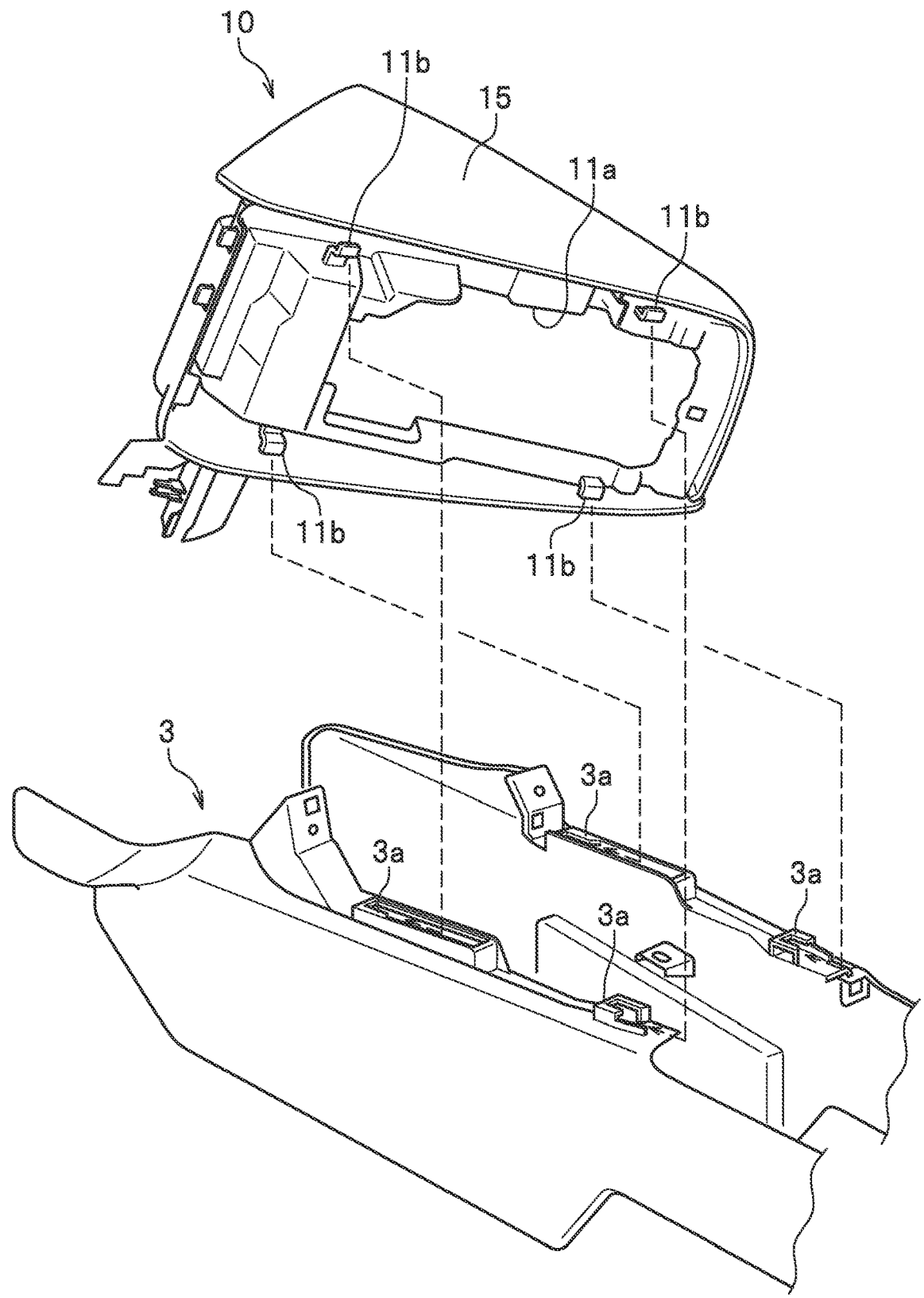
FIG. 3 is a schematic diagram for explaining how the center console and a connection member are combined.

In the present embodiment, the connection member 10 is formed by combining the connection-member main body, a panel portion, and the frame portion with one another. The connection-member main body integrally includes the front wall 12, rear rib 13, side rib 14, side wall 15, and extension wall 16. The panel portion is the front portion of the bottom wall 11, in other words, the article-placing portion of the first storage. The frame portion has a rectangular frame shape in plan view, which is the rear portion of the bottom wall 11, in other words, the peripheral edge portions of the hole 11a. Each side of the frame portion has a protruding shape protruding upward, and the front side of the frame portion is the protrusion 11c described earlier. The frame portion integrally includes a wall portion serving as the surface on the passenger seat 5 side of the side rib 14. In FIG. 3, illustration of the panel portion and the frame portion is omitted.

<Second Storage>

As illustrated in FIG. 5, the vehicle storage structure 1 includes the second storage 20 located at a higher position than the connection member (first storage) 10 and formed in the instrument panel 2 (in the instrument panel 2 and at the upper end of the connection member 10 in the present embodiment). The second storage 20 has an opening 20a in the instrument panel 2. In the present embodiment, the upper edge and both side edges in the vehicle width direction of the opening 20a having a rectangular shape in front view are formed on the instrument panel 2, and the lower edge of the opening 20a is formed on the extension wall 16 of the connection member 10. The second storage 20 integrally includes a lower wall 21 and upper wall 22 extending forward from the instrument panel 2 and side walls 23 and 24 extending forward from the instrument panel 2 and connecting the ends in the vehicle width direction of the lower wall 21 and upper wall 22. The second storage 20 also integrally includes a front wall 25 connecting the front ends of the lower wall 21, upper wall 22 and side walls 23 and 24. The upper surface of the lower wall 21 is a first article-placing portion on which an article A2 is placed.

In addition, the second storage 20 includes the extension wall 16 of the connection member 10, which serves as a second article-placing portion extending rearward from the lower wall 21 (toward the passenger compartment). The coefficient of friction of the upper surface of the extension wall 16 serving as the second article-placing portion is larger than the coefficient of friction of the upper surface of the lower wall 21 serving as the first article-placing portion. Here, the extension wall 16 may be a member (for example, a decorative member) made of a material different from the material of the first article-placing portion (lower wall 21). As for the decorative member, for example, the extension wall 16 may be formed by decorative molding, or a skin material may be provided on the upper surface of the extension wall 16. A decorative member may be provided on the outer surfaces of the connection-member main body described above (the rear surface of the rear rib 13, the driver's-seat-4-side side surface of the side rib 14, the passenger-seat-5-side side surface of the side wall 15, and the upper surface of the extension wall 16). This configuration improves the sense of unity among the instrument panel 2, the connection member 10, and the center console 3.

The far-side end (front end) of the upper surface of the extension wall 16 serving as the second article-placing portion is approximately flush with the passenger-compartment-side end (rear end) of the upper surface of the lower wall 21 serving as the first article-placing portion. The extension wall 16 is inclined such that the height decreases toward the passenger compartment side (rear side). In other words, the height position of the passenger-compartment-side end (rear end) of the upper surface of the extension wall 16 serving as the second article-placing portion is lower than the height position of the far-side end (front end) of the upper surface of the extension wall 16.

<Usage Example of Each Storage>

The occupant of the driver's seat 4 places his/her article (for example, an electronic device (mobile terminal) or the like) A1 on the bottom wall 11 (specifically, the non-contact charger 8) of the first storage 10 through the opening 10a. The stored article A1 in the first storage 10 is charged by the non-contact charger 8.

Here, between the passenger seat 5 and the first storage 10 is the side wall 15 and the actuator 7. Hence, the occupant of the passenger seat 5 places his/her article (for example, an electronic device (mobile terminal) or the like) A2 on the lower wall (first article-placing portion) 21 and the extension wall (second article-placing portion) 16 of the second storage 20 through the opening 20a. The article A2 placed on the lower wall 21 slides forward on the lower wall 21 and is stored in the second storage 20. The article A2 stored in the second storage 20 is connected to the connection terminal 6 via a not-illustrated cable or the like and charged by the vehicle battery.

The article A2 stored in the second storage 20 is placed on the lower wall (first article-placing portion) 21 and the extension wall (second article-placing portion) 16 of the second storage 20. Hence, when the article A2 stored in the second storage 20 seeks to move rearward due to vehicle's acceleration or deceleration or the like, the article A2 is held stably within the second storage 20 by the frictional resistance of the extension wall 16.

In addition, since the passenger-compartment-side end of the extension wall 16 is lower than the far-side end, the occupant, utilizing the fact that the passenger-compartment-side end of the extension wall 16 is lower, can take the article A2 out of the second storage 20 by holding the article A2 by nipping it from both upper and lower surfaces and sliding the article A2 rearward on the lower wall 21 via the state in which the article A2 is separated from the extension wall 16 but in contact with the lower wall 21. Here, the extension wall 16 having a high frictional resistance suitably helps the occupant to hold the article A2.

The vehicle storage structure 1 according to the embodiment of the present invention includes a center console 3, an instrument panel 2, and a storage having an opening 10a, 20a. The center console 3 includes a front portion. The storage is located at least one of the front portion, a portion in front of the center console 3, or the instrument panel 2. The storage includes a first storage (connection member 10) and a second storage 20. The first storage is located lower or higher than the second storage 20. The first storage includes a side wall 15 and the opening 10a. The side wall 15 is located proximate to a passenger seat 5 in a vehicle width direction. The opening 10a is located proximate to a driver's seat 4 in the vehicle width direction.

Thus, in the vehicle storage structure 1, the first storage is set for the occupant in the driver's seat 4, and the side wall 15 prevents the occupant of the passenger seat 5 from mistakenly taking an article A1. In addition, in the vehicle storage structure 1, since the height positions of the first storage and the second storage 20 are different, the dimensions in the vehicle width direction of the first storage and the second storage 20 can be set large, making it possible to widen the range of the types of articles A1 and A2 that can be stored. Further, in the vehicle storage structure 1, the side wall 15 suitably helps the occupant of the driver's seat 4 recognize the position of the first storage.

According to the vehicle storage structure, the first storage and an actuator 7 are located at the front portion of the center console 3. The actuator 7 is configured to actuate a device mounted on a vehicle. The actuator 7 is located at the rear of the first storage.

Thus, in the vehicle storage structure 1, the actuator 7 makes the occupant of the passenger seat 5 recognize that the front portion of the center console 3 is a space for the occupant of the driver's seat 4, and also the side wall 15 and the actuator 7 prevent the occupant of the passenger seat 5 from mistakenly taking the article A1.

According to the vehicle storage structure 1, the side wall 15 has an inclined portion 15a the height of which decreases toward the rear of the vehicle, and a rear end of the inclined portion 15a (the protrusion 11c of the bottom wall 11) is located rearwardly from a rear end of the first storage.

Thus, in the vehicle storage structure 1, since the side wall 15 extends further rearward than the first storage, the side wall 15 suitably prevents the occupant of the passenger seat 5 from taking a wrong article. In addition, in the vehicle storage structure 1, the dimension of the first storage in the front-rear direction can be set larger than the case where the upper end of the rear portion of the side wall 15 is not inclined, improving the usability of the first storage for the occupant of the driver's seat 4. Further, in the vehicle storage structure 1, in the case where the side wall 15 extends further rearward than the actuator 7, the side wall 15 can prevent the occupant of the passenger seat 5 from mistakenly touching the actuator 7.

According to the vehicle storage structure 1, a connection terminal 6 is provided on a vehicle-width-direction side of the opening 20a of the second storage 20, and the connection terminal 6 is closer to the passenger seat 5 than the side wall 15 in the vehicle width direction.

Thus, in the vehicle storage structure 1, the connection terminal 6 makes the second storage 20 convenient for the occupant of the passenger seat 5. In addition, in the vehicle storage structure 1, since the connection terminal 6 is provided on the passenger seat 5 side of the side wall 15 in the vehicle width direction, it is possible to prevent the cable for connecting an article A2 stored in the second storage 20 and the connection terminal 6 from interfering the occupant of the driver's seat 4 using the first storage and the actuator 7.

In the vehicle storage structure 1, the first storage has a non-contact charger 8 that wirelessly transfers electric power to an electronic device.

Thus, in the vehicle storage structure 1, it is possible to charge the article A1 of the occupant of the driver's seat 4 without a cable and also it is possible to prevent the cable from interfering the article A1 being put into or taken out of the first storage.

It is understood that the foregoing description is that of the preferred embodiments of the invention and that various changes and modifications may be made thereto without departing from the spirit and scope of the invention as defined in the appended claims. For example, in the case where the instrument panel 2 and the center console 3 are separated in the front-rear direction, at least one of the first storage and the second storage 20 may be provided in front of the center console 3 (between the instrument panel 2 and the center console 3 in the front-rear direction).

In addition, the article-placing portion (panel portion) in the first storage may be provided integrally with the center console 3 not with the connection member 10.

Further, the second storage 20 may be provided on an interior member other than the instrument panel 2.

What is claimed is:

1. A vehicle storage structure comprising a center console, an instrument panel, and a storage having an opening, wherein the center console includes a front part, the storage is located at at least one of the front part, a portion in front of the center console, or the instrument panel, the storage includes a first storage and a second storage,
the first storage is located lower or higher than the second storage,
the first storage and an actuator are located at the front part,
the actuator is configured to actuate a device mounted on a vehicle,
the actuator is located at a rear of the first storage the first storage includes a side wall and a first opening,
the side wall is located proximate to a passenger seat in a vehicle width direction,
the side wall is located further away from the passenger seat as the side wall nears the second storage relative to the first storage,
the first opening is located proximate to a driver seat in the vehicle width direction, and
a rear end portion of the side wall is located rearwardly from a rear end portion of the first opening and the actuator.

2. The vehicle storage structure according to claim 1, wherein
the side wall has an inclined portion,
the inclined portion has a first rear end portion and a height that decreases toward a vehicle rear,
the first storage has a second rear end portion, and
the first rear end portion is located rearwardly from the second rear end portion.

3. The vehicle storage structure according to claim 1, wherein
the second storage has a second opening,
the vehicle storage structure includes a connection terminal at the side of the second opening in the vehicle width direction, and
the connection terminal is closer to the passenger seat than the side wall in the vehicle width direction.

4. The vehicle storage structure according to claim 1, wherein
the first storage includes a non-contact charger, and
the non-contact charger is configured to wirelessly transfer electric power to an electronic device.

5. The vehicle storage structure according to claim 2, wherein
the second storage has a second opening,
the vehicle storage structure includes a connection terminal at the side of the second opening in the vehicle width direction, and
the connection terminal is closer to the passenger seat than the side wall in the vehicle width direction.

6. The vehicle storage structure according to claim 2, wherein
the first storage includes a non-contact charger, and
the non-contact charger is configured to wirelessly transfer electric power to an electronic device.

7. The vehicle storage structure according to claim 3, wherein
the first storage includes a non-contact charger, and
the non-contact charger is configured to wirelessly transfer electric power to an electronic device.

8. The vehicle storage structure according to claim 5, wherein
the first storage includes a non-contact charger, and
the non-contact charger is configured to wirelessly transfer electric power to an electronic device.

* * * * *